(12) United States Patent
Kunkel et al.

(10) Patent No.: US 11,041,459 B2
(45) Date of Patent: Jun. 22, 2021

(54) EXHAUST GAS HEAT RECOVERY SYSTEM

(71) Applicant: Tenneco Automotive Operating Company Inc., Lake Forest, IL (US)

(72) Inventors: Brian A. Kunkel, Dexter, MI (US); John Stanavich, Chelsea, MI (US); Keith G. Olivier, Jackson, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 196 days.

(21) Appl. No.: 16/213,310

(22) Filed: Dec. 7, 2018

(65) Prior Publication Data

US 2020/0182192 A1 Jun. 11, 2020

(51) Int. Cl.
*F02G 5/02* (2006.01)
*F01N 5/02* (2006.01)
(Continued)

(52) U.S. Cl.
CPC .......... *F02G 5/02* (2013.01); *F01N 5/02* (2013.01); *F28D 21/0003* (2013.01);
(Continued)

(58) Field of Classification Search
CPC .... F02G 5/02; F02G 5/04; F28F 27/02; F28F 9/001; F01N 5/02; F16K 11/052;
(Continued)

(56) References Cited

U.S. PATENT DOCUMENTS 3,228,653 A * 1/1966 Trimmer ............. F16K 27/0263
251/306
4,877,339 A * 10/1989 Schuster .................. F02D 9/04
384/218
(Continued)

FOREIGN PATENT DOCUMENTS

CA 2474065 A1 * 7/2003 ............. F02M 26/26
DE 102012104396 B4 12/2015
(Continued)

OTHER PUBLICATIONS

International Search Report and Written Opinion for Corresponding Application No. PCT/US2019/064382, dated Mar. 23, 2020.

*Primary Examiner* — Joel M Attey
*Assistant Examiner* — For K Ling
(74) *Attorney, Agent, or Firm* — Harness, Dickey & Pierce, P.L.C.

(57) ABSTRACT

An exhaust gas heat recovery system includes a housing, a heat exchanger and a valve assembly. The valve assembly is disposed within the housing and includes a monolithic valve body, a moveable valve plate and a rotatable valve shaft. The valve body includes a bore, a valve seat surrounding the bore and trunnions integrally formed with the valve seat. The trunnions are diametrically opposed to each other and laterally extending outside of the housing. The valve plate coupled for rotation with the valve shaft between a first position allowing exhaust gas flow through the bore and the first exhaust gas passageway, and a second position allowing exhaust gas flow through the second exhaust gas passageway and preventing exhaust gas flow through the bore and the first exhaust gas passageway. The valve shaft being supported for rotation by the trunnions.

20 Claims, 9 Drawing Sheets

(51) Int. Cl.
  *F28D 21/00* (2006.01)
  *F28F 27/02* (2006.01)

(52) U.S. Cl.
  CPC .......... *F28F 27/02* (2013.01); *F01N 2260/02* (2013.01); *F28F 2250/06* (2013.01)

(58) Field of Classification Search
  CPC ........ F16K 11/0525; F16K 1/205; F16K 3/04; F02D 9/04; F02D 9/106; F02M 26/26
  See application file for complete search history.

(56) References Cited

U.S. PATENT DOCUMENTS

| | | | |
|---|---|---|---|
| 7,032,577 B2 * | 4/2006 | Rosin | F28D 7/1684 |
| | | | 123/568.12 |
| 7,063,134 B2 | 6/2006 | Poole et al. | |
| 7,264,040 B2 * | 9/2007 | Bush | B60H 1/18 |
| | | | 165/103 |
| 8,152,137 B2 | 4/2012 | Comin et al. | |
| 8,439,073 B2 | 5/2013 | Marocchini et al. | |
| 8,469,336 B2 | 6/2013 | Nakamura et al. | |
| 9,394,813 B2 | 7/2016 | Geminn et al. | |
| 10,041,389 B2 * | 8/2018 | Weidner | F01N 3/043 |
| 2012/0017575 A1 | 1/2012 | Sloss | |
| 2013/0213606 A1 | 8/2013 | Greber | |
| 2014/0251579 A1 * | 9/2014 | Sloss | F28D 21/0003 |
| | | | 165/96 |
| 2016/0010531 A1 * | 1/2016 | Dom Nguez | F01N 5/02 |
| | | | 60/320 |
| 2016/0032794 A1 | 2/2016 | Fischer et al. | |
| 2016/0258548 A1 * | 9/2016 | Bartolo | F16K 31/521 |
| 2017/0191391 A1 | 7/2017 | Weidner et al. | |
| 2017/0241349 A1 | 8/2017 | Greber et al. | |
| 2017/0292429 A1 | 10/2017 | Murata et al. | |
| 2017/0335740 A1 * | 11/2017 | Dries | F28D 21/0003 |
| 2017/0362988 A1 * | 12/2017 | Matsuura | F28F 3/042 |
| 2018/0003097 A1 * | 1/2018 | Godard | F01N 5/02 |
| 2018/0171940 A1 * | 6/2018 | Gonz Lez | F02M 26/30 |

FOREIGN PATENT DOCUMENTS

| | | | | |
|---|---|---|---|---|
| FR | 2989998 B1 | 5/2016 | | |
| GB | 2277368 A | * 10/1994 | | F16F 1/022 |
| JP | 2008157211 A | 7/2008 | | |
| JP | 2009030569 A | 2/2009 | | |
| JP | 2009191630 A | 8/2009 | | |
| JP | 5058050 B2 | 10/2012 | | |
| JP | 2016044666 A | 4/2016 | | |
| JP | 2018127958 A | 8/2018 | | |
| KR | 100871766 B1 | 12/2008 | | |
| KR | 101708777 B1 | * 2/2017 | | |
| WO | WO-2008098814 A1 | * 8/2008 | | F16K 11/0525 |

\* cited by examiner

EXHAUST GAS HEAT RECOVERY SYSTEM

FIELD

The present disclosure relates to an exhaust gas heat recovery system.

BACKGROUND

This section provides background information related to the present disclosure and is not necessarily prior art.

A significant amount of energy in fuel consumed by an internal combustion engine is lost as heat rejected through an exhaust system associated with the internal combustion engine. It is desirable to recover at least some of the thermal energy from exhaust gas flowing through the exhaust system for various purposes. For example, such recovered thermal energy can be used to heat vehicle fluids to provide faster passenger cabin warm-up and windshield defrosting. Additionally or alternatively, the recovered thermal energy can be used to improve fuel economy by reducing friction and viscous losses in the vehicle lubrication systems, for example.

SUMMARY

This section provides a general summary of the disclosure, and is not a comprehensive disclosure of its full scope or all of its features.

In one form, the present disclosure provides an exhaust gas heat recovery system that includes a housing, a heat exchanger and a valve assembly. The housing defines an inlet, an outlet, and a first exhaust gas passageway in fluid communication with the inlet and the outlet. The heat exchanger at least partially defines a second exhaust gas passageway in fluid communication with the inlet and the outlet and includes a heat exchanger core having a working fluid circulating therein. The working fluid being in thermal communication with exhaust gas in the second exhaust gas passageway. The valve assembly is disposed within the housing and includes a monolithic valve body, a moveable valve plate and a rotatable valve shaft. The valve body includes a bore, a valve seat surrounding the bore and trunnions integrally formed with the valve seat. The trunnions being diametrically opposed to each other and laterally extending outside of the housing. The valve plate coupled for rotation with the valve shaft between a first position allowing exhaust gas flow through the bore and the first exhaust gas passageway, and a second position allowing exhaust gas flow through the second exhaust gas passageway and preventing exhaust gas flow through the bore and the first exhaust gas passageway. The valve shaft being supported for rotation by the trunnions.

In some configurations of the EGHR system of the above paragraph, the valve body is a casting.

In some configurations of the EGHR system of any one or more of the above paragraphs, the valve body is symmetrical about a plane dividing the first exhaust gas passageway in half.

In some configurations of the EGHR system of any one or more of the above paragraphs, wherein the trunnions protrude equal distances away from the housing so that an actuator is adaptable to be positioned on either side of the valve seat.

In some configurations of the EGHR system of any one or more of the above paragraphs, each trunnion includes a cavity defined by an as-cast inner wall. The EGHR system further comprising a bushing directly engaging the as-cast inner wall and supporting the valve shaft for rotation.

In some configurations of the EGHR system of any one or more of the above paragraphs, the valve seat includes lands surrounding each trunnion. The housing being welded to the valve seat at each land.

In some configurations of the EGHR system of any one or more of the above paragraphs, the valve body includes outer walls contoured to correspond to inner walls of the housing to restrict exhaust gas from passing between the valve body and the housing.

In some configurations of the EGHR system of any one or more of the above paragraphs, the trunnions are coaxially aligned.

In some configurations of the EGHR system of any one or more of the above paragraphs, the housing includes first and second shells defining the inlet, the outlet and the first exhaust gas passageway. The valve shaft includes an axis of rotation positioned at a joint of the first and second shells.

In some configurations of the EGHR system of any one or more of the above paragraphs, the first shell includes first semi-circular recesses and the second shell includes second semi-circular recesses that cooperate to define openings at the joint. The trunnions extend through the openings and outside of the housing.

In some configurations of the EGHR system of any one or more of the above paragraphs, the valve shaft and the trunnions are coaxially aligned. The valve plate is rotatable about an axis that is offset from the bore.

In another form, the present disclosure provides an exhaust gas heat recovery system that includes a housing, a heat exchanger and a valve assembly. The housing defines an inlet, an outlet, and a first exhaust gas passageway in fluid communication with the inlet and the outlet. The heat exchanger at least partially defines a second exhaust gas passageway in fluid communication with the inlet and the outlet and includes a heat exchanger core having a working fluid circulating therein. The working fluid being in thermal communication with exhaust gas in the second exhaust gas passageway. The valve assembly is disposed within the housing and includes a monolithic valve body and a rotatable valve plate. The valve body includes a bore that forms a portion of the first exhaust gas passageway, a valve seat surrounding the bore and trunnions integrally formed with the valve seat. The valve plate being coupled for rotation with the trunnions. The valve plate being rotatable between a first position spaced apart from the valve seat whereat the valve plate restricts exhaust gas flow through the second exhaust passageway and allows exhaust gas flow through the bore, and a second position in engagement with the valve seat to restrict exhaust gas flow through the bore and divert exhaust gas flow through the second exhaust gas passageway.

In some configurations of the EGHR system of the above paragraph, the valve body is a casting.

In some configurations of the EGHR system of any one or more of the above paragraphs, the trunnions laterally extend outside of the housing.

In some configurations of the EGHR system of any one or more of the above paragraphs, the valve body is symmetrical about a plane dividing the first exhaust gas passageway in half.

In some configurations of the EGHR system of any one or more of the above paragraphs, the trunnions protrude equal distances away from the housing so that an actuator is adaptable to be positioned on either side of the valve seat.

In some configurations of the EGHR system of any one or more of the above paragraphs, the trunnions are coaxially aligned.

In some configurations of the EGHR system of any one or more of the above paragraphs, the valve seat includes lands surrounding each trunnion. The housing being welded to the valve seat at each land.

In some configurations of the EGHR system of any one or more of the above paragraphs, the housing includes first and second shells defining the inlet, the outlet and the first exhaust gas passageway. The valve plate rotatable about an axis positioned at a joint of the first and second shells.

In some configurations of the EGHR system of any one or more of the above paragraphs, the first shell includes first semi-circular recesses and the second shell includes second semi-circular recesses that cooperate to define openings at the joint. The trunnions extend through the openings and outside of the housing.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

As shown in FIGS. 1-8, an exhaust gas heat recovery system (EGHR system) 10 is provided. The EGHR system 10 may be disposed in an exhaust gas flow path of an engine exhaust system 12 at any suitable location between a cylinder head 14 associated with an engine 16 and a tailpipe (not shown) through which fluid such as exhaust gas is discharged into ambient air. In some configurations, the EGHR system 10 may be in direct or indirect fluid communication with a catalytic converter, a $NO_X$ trap, an exhaust manifold, a turbo charger, or any other exhaust system component. In some configurations, an exhaust gas recirculation (EGR) device (not shown) may be disposed between the engine 16 and the EGHR system 10. In such configurations, the EGHR system 10 may receive substantially all of the exhaust gas that is not recirculated from the EGR device back to an engine intake charge air system 18 and/or an intake air pipe 20. With reference to FIGS. 2-9, the EGHR system 10 may include a housing assembly 22, a valve assembly 24, a heat exchanger assembly 26 and an actuator assembly 28.

Figure 6:
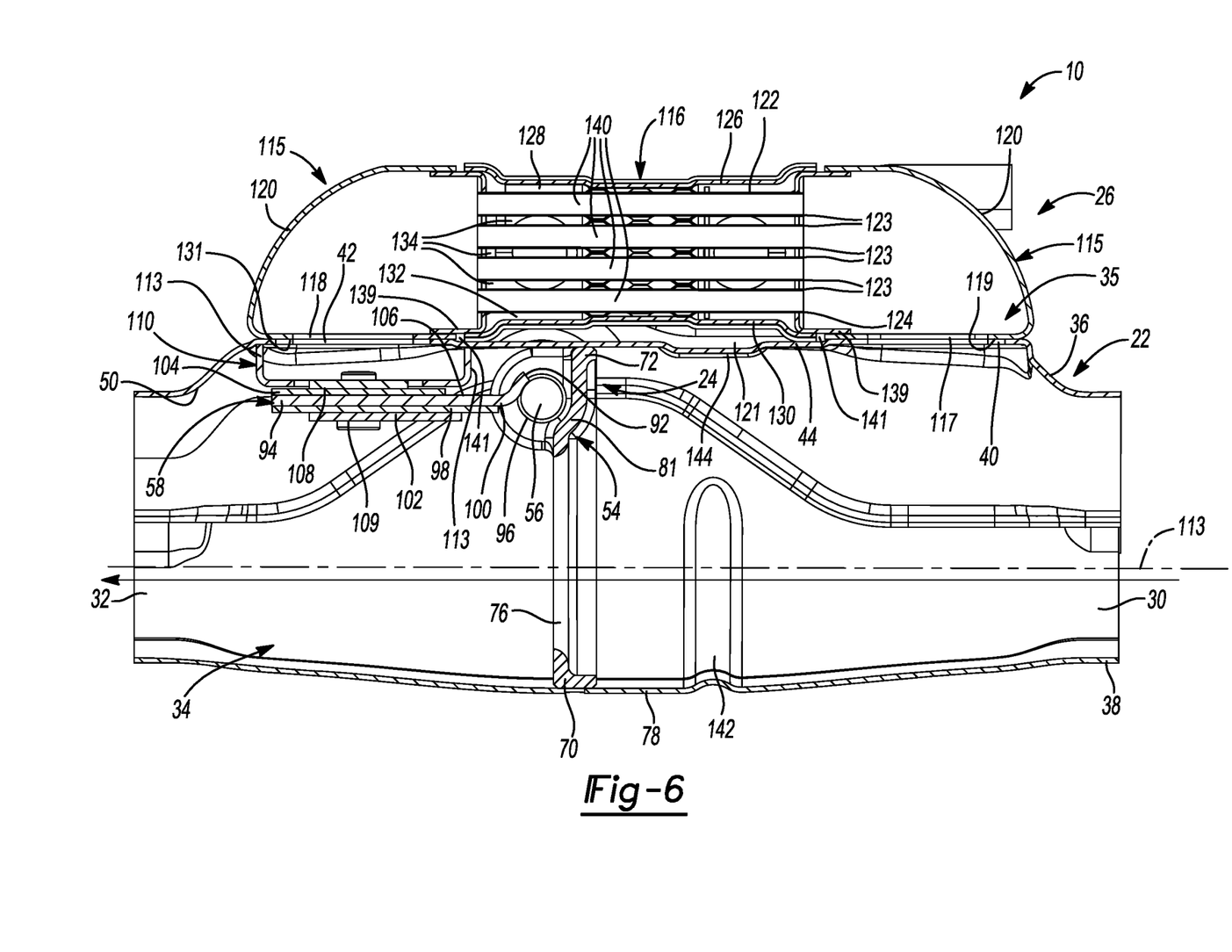
FIG. 6 is a cross-sectional view of the exhaust gas heat recovery system in a bypass position.
Figure 7:
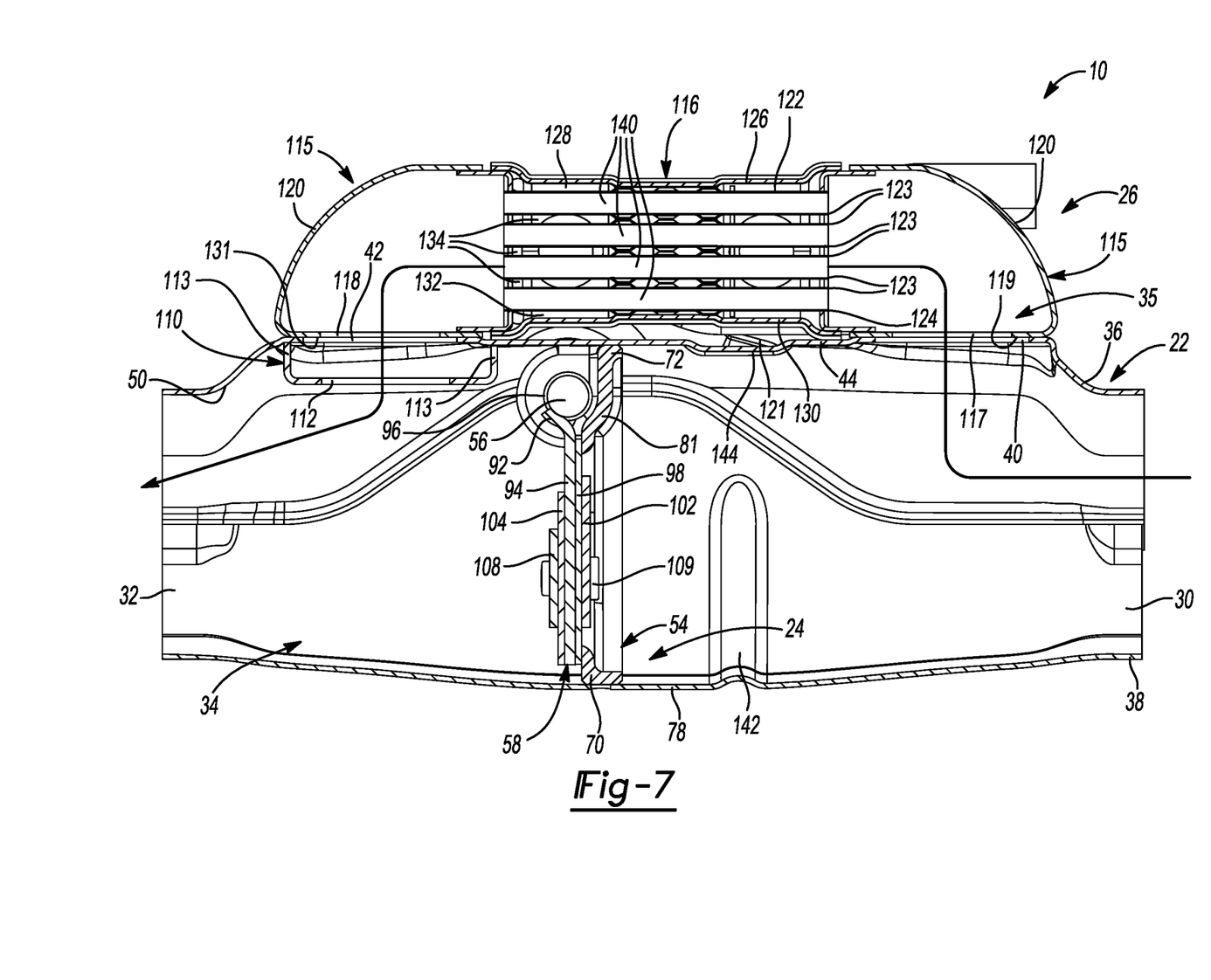
FIG. 7 is a cross-sectional view of the exhaust gas heat recovery system in a heat-exchange position.

As shown in FIGS. 6 and 7, the housing assembly 22 may define an inlet 30, an outlet 32 and a bypass or first fluid passageway 34 extending in a longitudinal direction of the housing assembly 22 and between the inlet 30 and the outlet 32. As shown in FIGS. 6 and 7, the housing assembly 22 may also cooperate with the heat exchanger assembly 26 to define a second fluid passageway 35 extending between the inlet 30 and the outlet 32.

Figure 1:
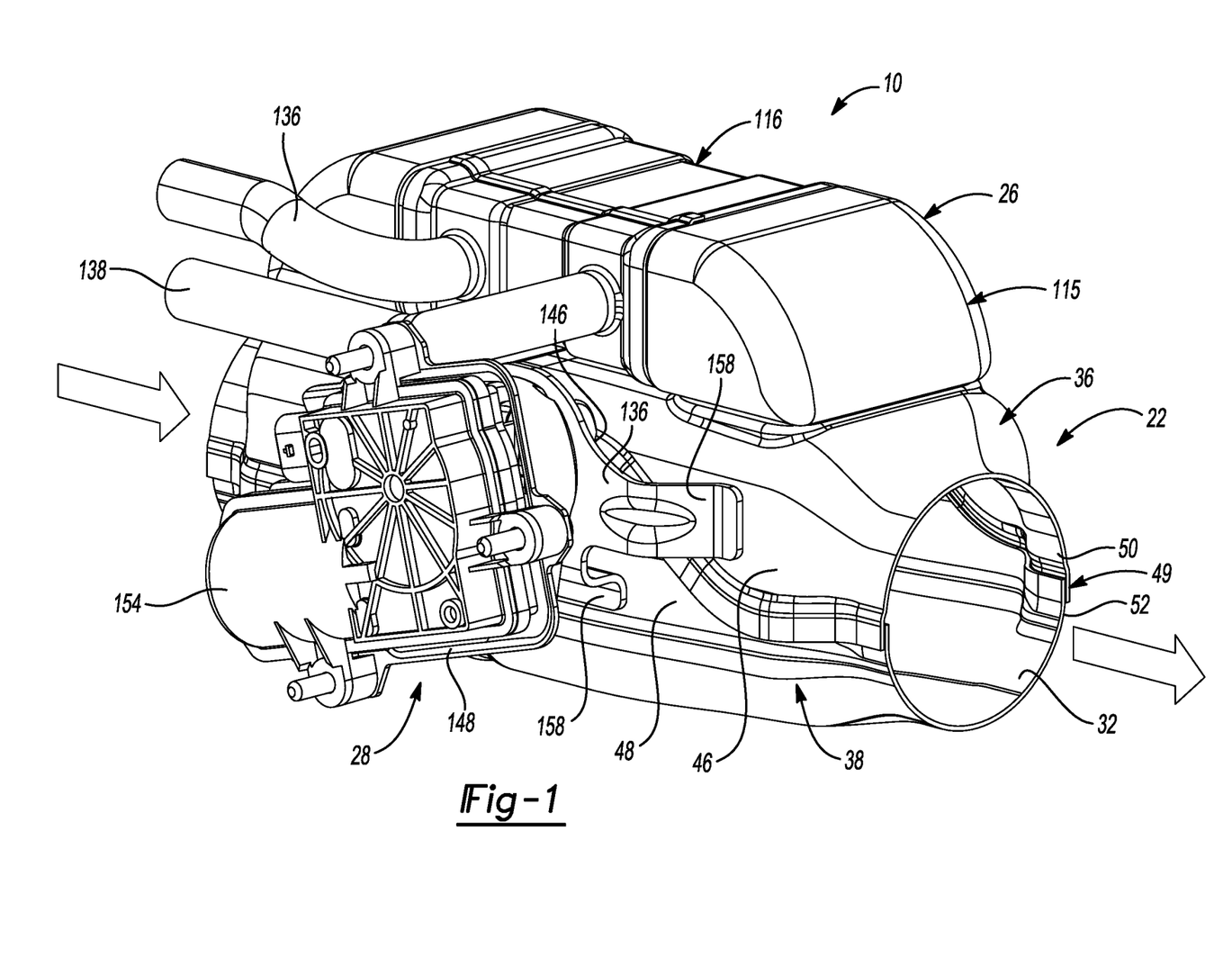
FIG. 1 is a perspective view of an exhaust gas heat recovery system according to the principles of the present disclosure.
Figure 2:
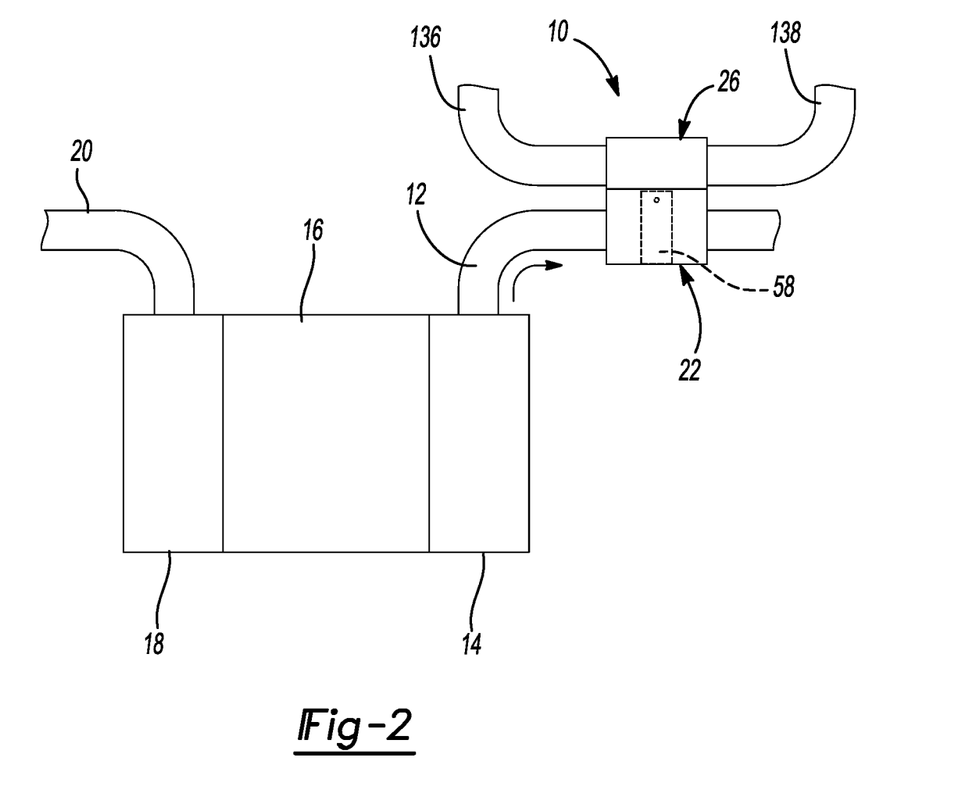
FIG. 2 is a schematic representation of an engine and an exhaust system having the exhaust gas heat recovery system.
Figure 3:
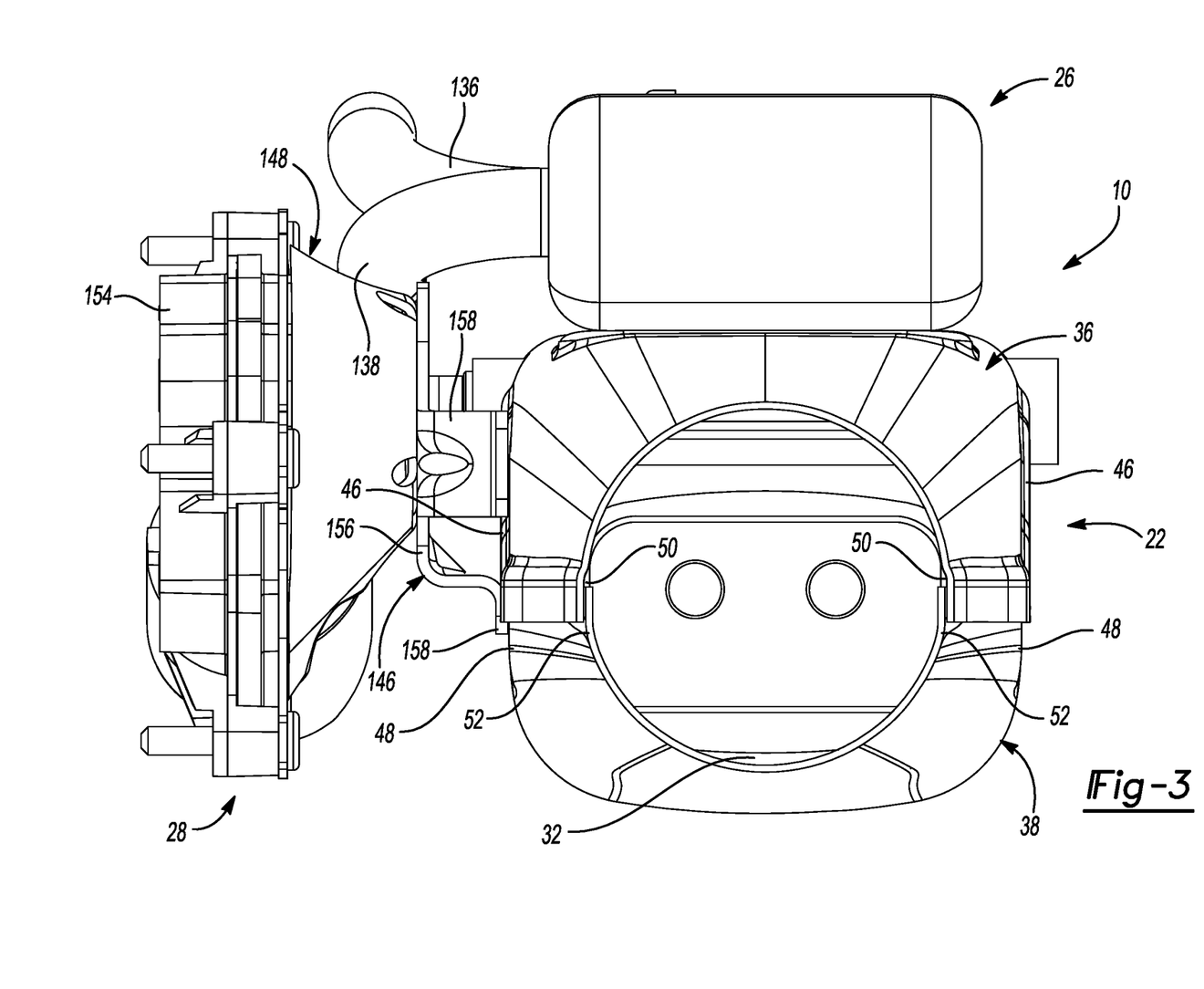
FIG. 3 is a front view of the exhaust gas heat recovery system.
Figure 4:
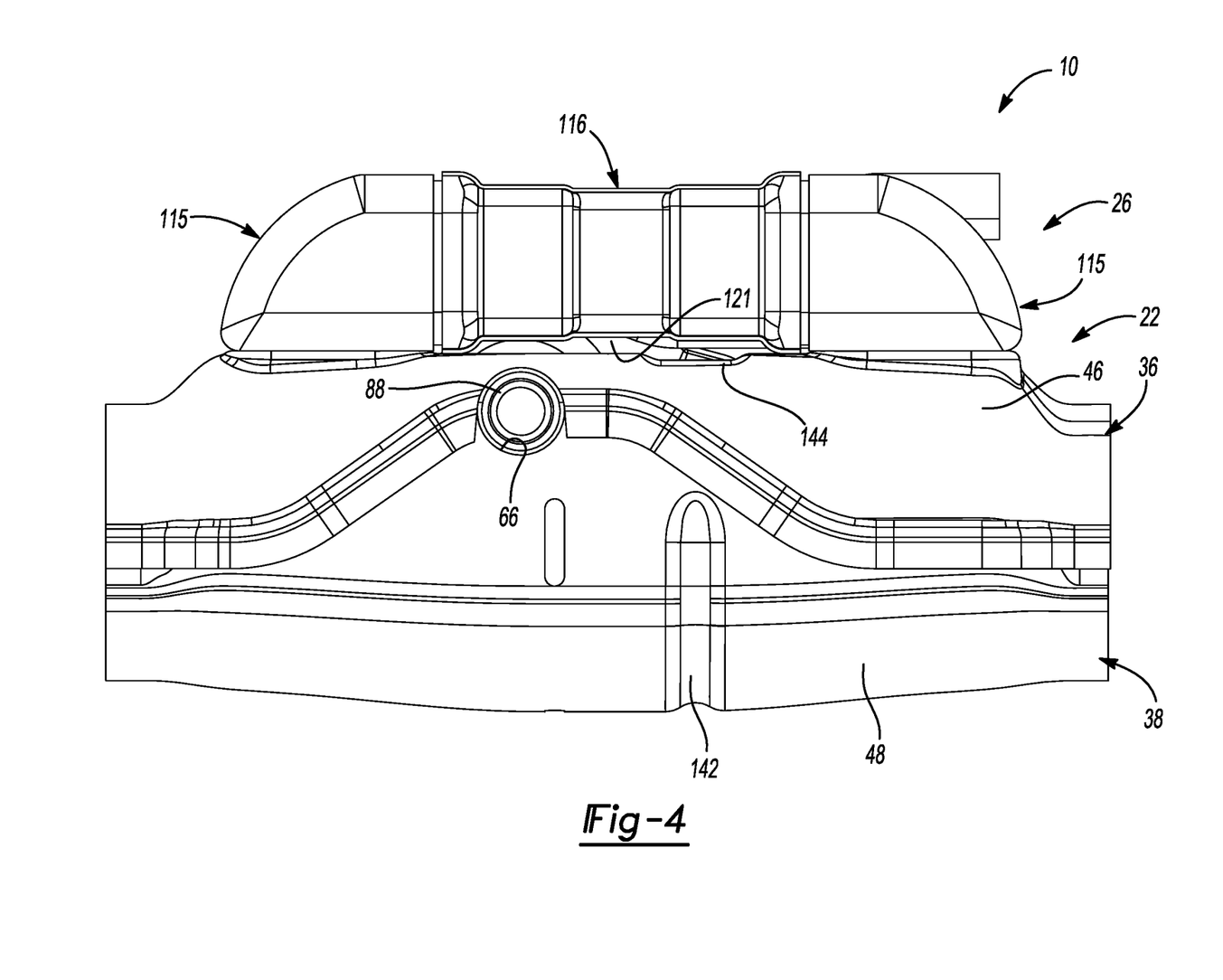
FIG. 4 is a side view of the exhaust gas heat recovery system.
Figure 5:
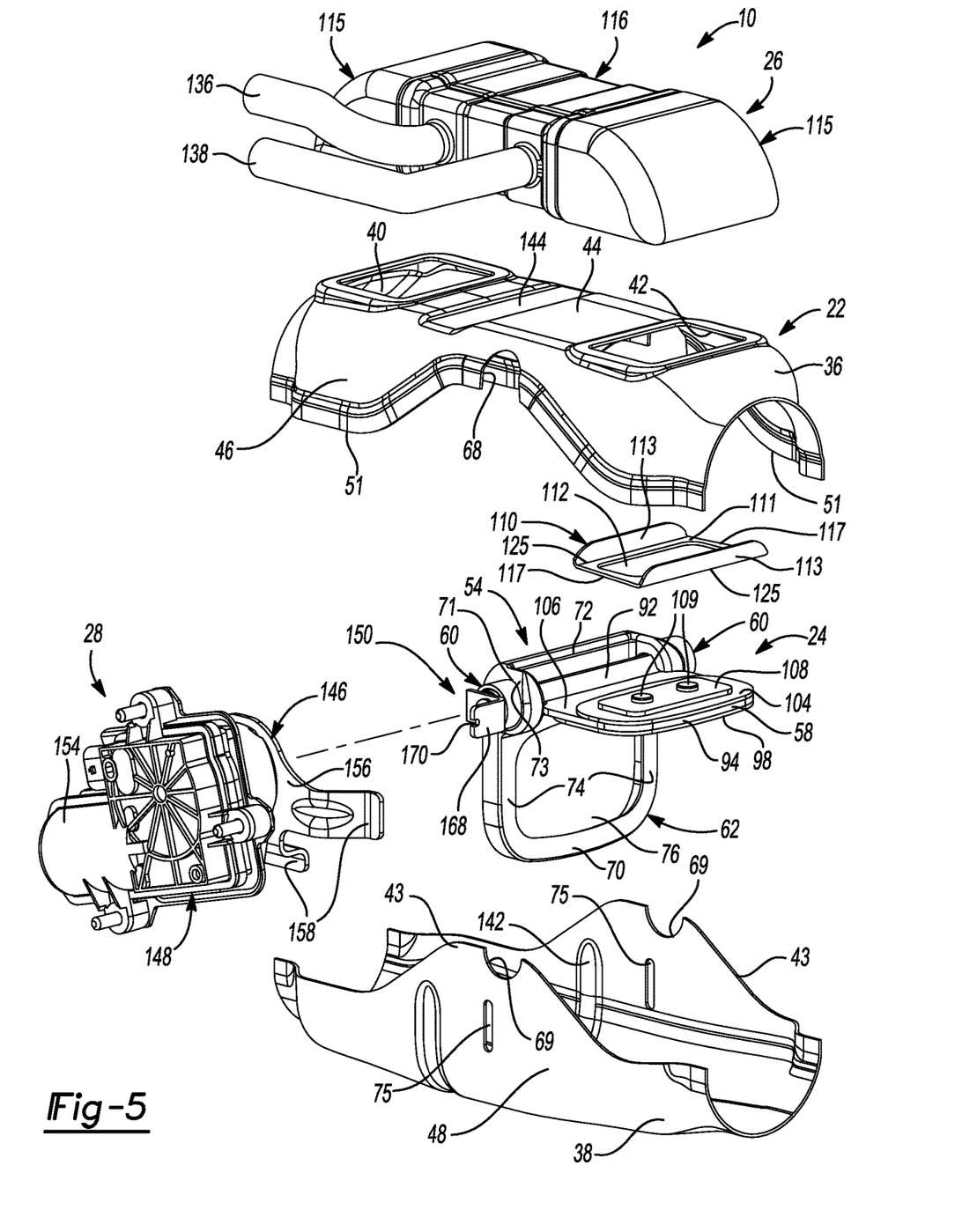
FIG. 5 is an exploded perspective view of the exhaust gas heat recovery system.

The housing assembly 22 may include a first or upper shell 36 and a second or lower shell 38. With reference to FIGS. 5-7, the first shell 36 may have a generally semi-circular or "U" cross-sectional shape (FIG. 5) and may define a heat exchanger inlet 40 and a heat exchanger outlet 42 at a top side 44 thereof. The second shell 38 may have a generally semi-circular or "U" cross-sectional shape and may be attached to the first shell 36 such that the first and second shells 36, 38 cooperate to define the inlet 30, the outlet 32 and the bypass passageway 34. The first and second shells 36, 38 may also be attached (e.g., welded) to each other at a joint 49. In some configurations, the first shell 36 may include an end portion or edge 51 of sides 46 that overlap a respective end portion or edge 43 of sides 48 of the second shell 38 at the joint 49. Stated another way, an inner surface 50 of the first shell 36 is attached (e.g., welded) to an outer surface 52 of the second shell 38 at the joint 49. In this way, the EGHR system 10 may include fewer components, which may simply manufacturing and assembly of the EGHR system 10.

With reference to FIGS. 6-9, the valve assembly 24 may be disposed within the housing assembly 22 and may include a monolithic valve body or housing 54, a valve shaft 56 and a valve plate 58. The valve body 54 may be a casting and may be symmetrical about a plane A dividing the first fluid passageway 34 in half. The valve body 54 may include trunnions 60 and a valve seat 62. The trunnions 60 may be diametrically opposed to each other and may be integrally formed with the valve seat 62. The trunnions 60 may each define an aperture or cavity 64 extending at least partially therethrough. The cavity 64 may be defined by an as-cast inner wall 65 that is not machined after casting. Each trunnion 60 may extend laterally through an opening 66 defined by the first and second shells 36, 38. The openings 66 are at least partially defined by elongated or possibly semi-circular first recesses 68 formed in the first shell 36 and corresponding elongated or possibly semi-circular second recesses 69 formed in the second shell 38.

The valve seat 62 may include lands 71 surrounding each trunnion 60. The first and second shells 36, 38 are welded to the valve seat 62 at each land 71. The valve seat 62 may be attached (e.g., welded) to the first and second shells 36, 38 at the joint. The valve seat 62 may include outside walls 73 that are contoured to correspond to the inner walls 50 of the first shell 36 to restrict exhaust gas from passing between the valve seat 62 and the housing assembly 22 and out the EGHR system 10. The valve seat 62 may include a bottom wall 70, a top wall 72 and side walls 74 that define a rectangular-shaped opening or bore 76. In some configurations, the bottom wall 70 and a bottom 78 of the second shell 38 may be attached (e.g., welded) to each other. The top wall 72 and the top side 44 of the first shell 36 may be attached (e.g., welded) to each other. Side walls 74 and the sides 48 of the second shell 38 may be attached (e.g., welded) to each other via an opening 75. In this way, any gaps between the valve seat 62 and the housing assembly 22 are removed, which reduces internal leaks (i.e., fluid flowing through gaps between the valve seat 62 and the housing assembly 22 and not through the heat exchanger assembly 26) of the EGHR system 10. The rectangular-shaped opening 76 increases the flow rate of fluid flowing through the first fluid passageway 34 compared to a circular opening, for example. The valve seat 62 may also include a wall 81 that curves around a portion of the valve shaft 56.

Figure 8:
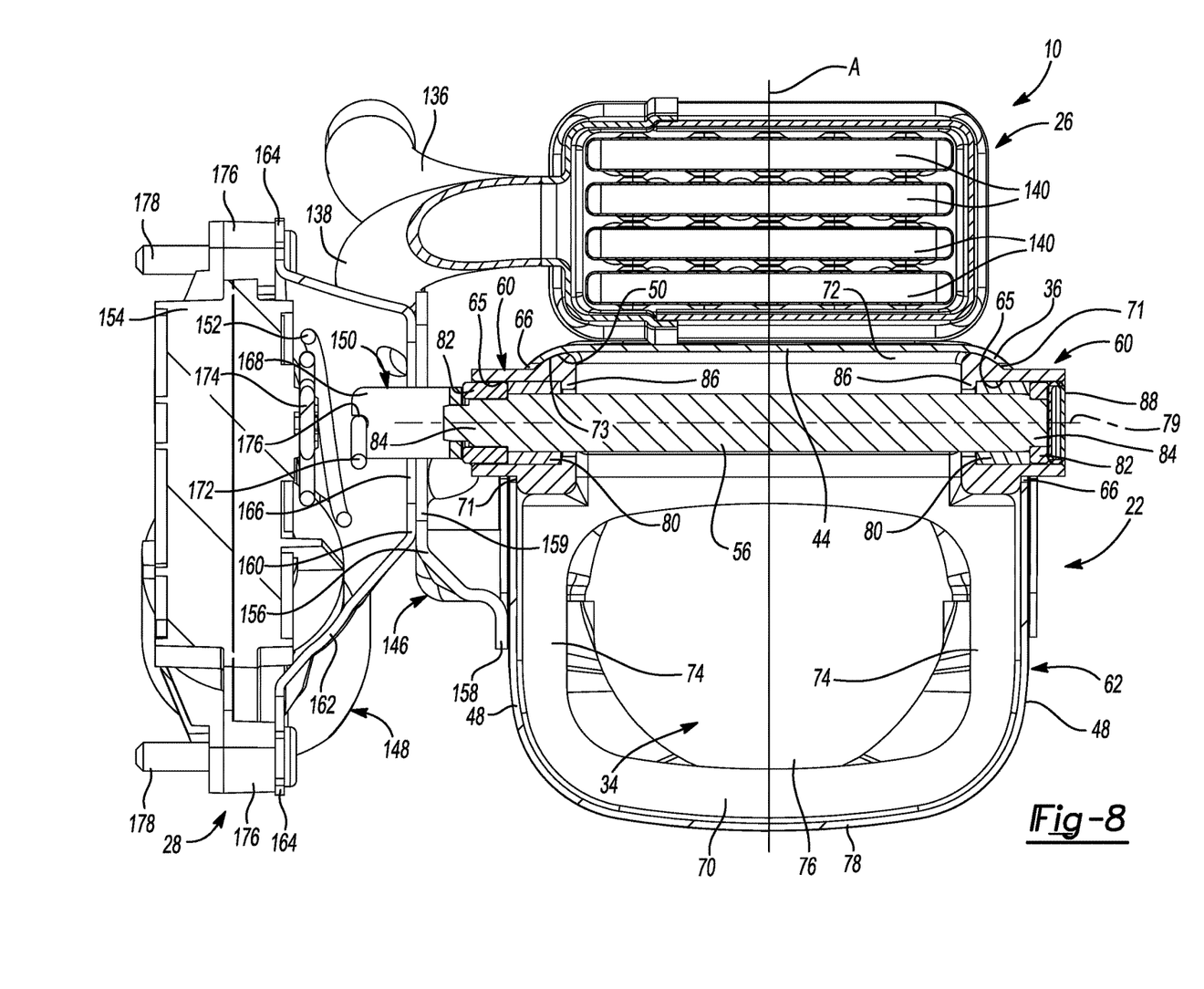
FIG. 8 is another cross-sectional view of the exhaust gas heat recovery system in the bypass position.
Figure 9:
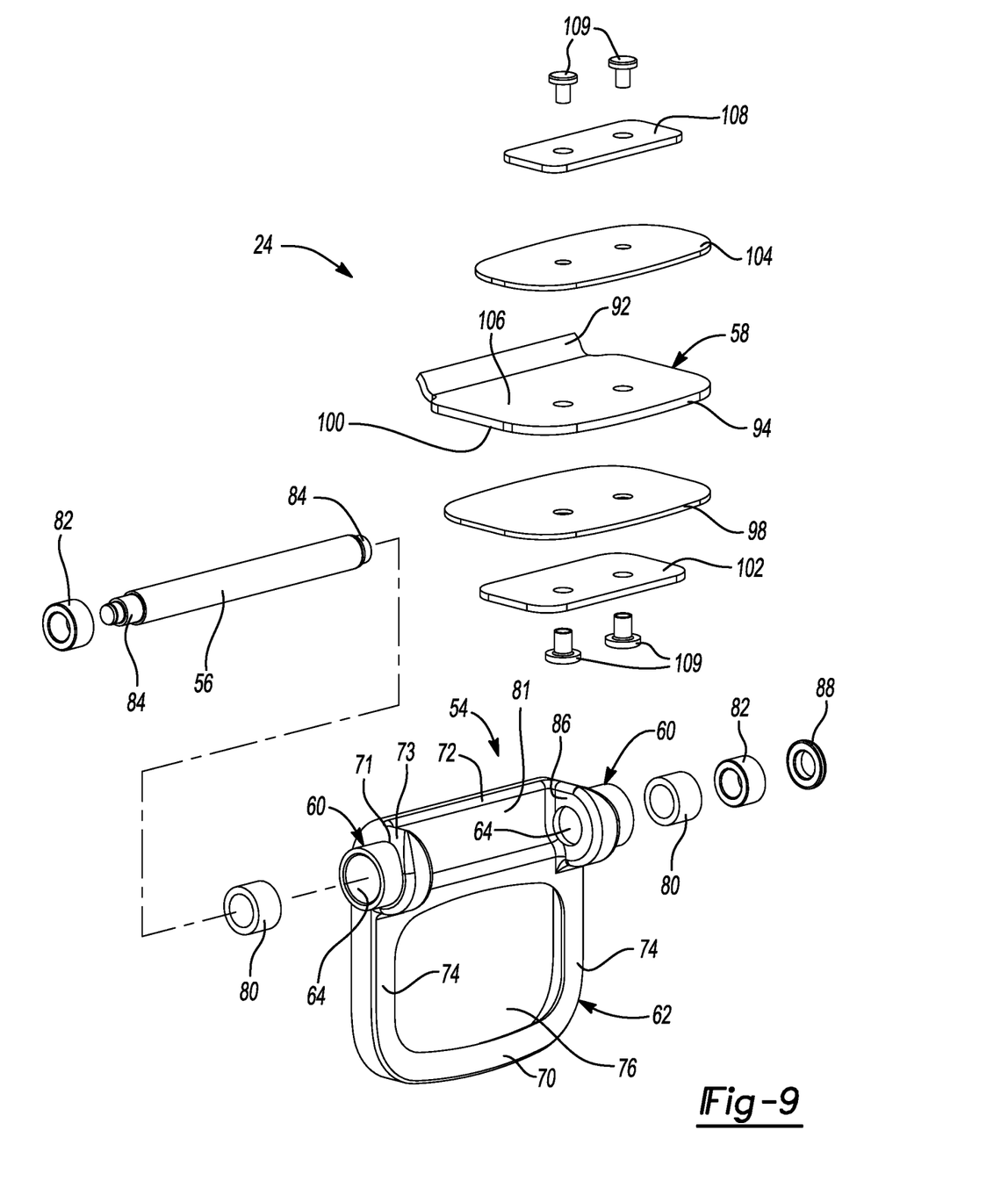
FIG. 9 is an exploded perspective view of a valve assembly of the exhaust gas heat recovery system.

As shown in FIG. 8, the valve shaft 56 may extend transverse (i.e., perpendicular relative to the longitudinal direction of the housing assembly 22) to the bypass passageway 34 and may have an axis 79 that is positioned at the joint 49 of the first and second shells 36, 38 (i.e., the axis is offset from the opening 76 defined in the valve seat 62). The valve shaft 56 and the trunnions 60 may be coaxially aligned. A wire-mesh bushing 80 and a ring 82 may be disposed within the aperture 64 of each trunnion 60 and may directly engage the as-cast inner wall 65. The wire-mesh bushing 80 may be disposed on opposing ends 84 of the valve shaft 56 to rotatably support the valve shaft 56. The final shape and density of each bushing 80 are achieved after being disposed within the aperture 64 of each trunnion 60. In this way, the bushings 80 retention to the aperture 64 under axial loading is improved. Each ring 82 may be sealingly engage with a respective trunnion 60. A protrusion 86 may extend radially inwardly (i.e., perpendicular relative to the axis 79 of the valve shaft 56) from the inner wall 65 of the aperture 64. In this way, the ring 82 and the protrusion 86 may cooperate to prevent the bushing 80 from moving axially within the aperture 64. The ring 82 may also reduce external leaks (i.e., fluid flowing out of the EGHR system 10) of the EGHR system 10. A cap 88 may be disposed within the aperture 64 of one of the trunnions 60 and may be adjacent to one of the ends 84 of the valve shaft 56. The cap 88 may be sealingly engaged with the one of the trunnions 60 such that fluid flowing through the first fluid passageway 34 does not leak out the EGHR system 10. In some configurations, the cap 88 may be disposed outside of the aperture 64 and may be pressed onto one of the ends 84 of the valve shaft 56. In such configurations, the cap 88 may cover the aperture 64 such that fluid flowing through the first fluid passageway 34 does not leak out the EGHR system 10. The actuator assembly 28 may be attached to the other end 84 of the valve shaft 56.

The valve plate 58 may disposed within the housing assembly 22 and fixed for rotation with the valve shaft 56. The valve plate 58 may be rotatable about the axis 79 of the valve shaft 56 between a first position (FIG. 6) whereat fluid flows through the bypass passageway 34 and fluid is prevented from flowing through the second fluid passageway 35. FIG. 7 depicts the valve plate 58 at a second position allowing fluid flow through the second fluid passageway 35 and preventing fluid flow through the bypass passageway 34. The valve plate 58 angle of rotation between the first and second positions may be between 45 degrees and 120 degrees, for example.

The valve plate 58 may include a curved first portion 92 and a generally rectangular-shaped and planar second portion 94 extending from the first portion 92. The first portion 92 may be attached (e.g., welded) to a diametrical surface 96 of the valve shaft 56 so that the valve plate 58 is rotationally fixed to the valve shaft 56. A first pad 98 may be positioned on a first surface 100 of the second portion 94 of the valve plate 58. The first pad 98 may have a surface area that is smaller than a surface area of the second portion 94. A first retainer 102 may be positioned on a surface of the first pad 98 opposite the second portion 94. The first retainer 102 may have a surface area that is smaller than the surface area of the first pad 98. A second pad 104 may be positioned on a second surface 106 opposite the first surface 100 of the second portion 94 of the valve plate 58. The second pad 104 may have a surface area that is smaller than the surface area of the second portion 94 and the first pad 98. A second retainer 108 may be positioned on a surface of the second pad 104 opposite the second portion 94. The second retainer 108 may have a surface area that is smaller than the surface area of the second pad 104. A plurality of fasteners 109 (e.g., rivets, bolts, screws) may extend through the valve plate 58, the pads 98, 104 and the retainers 102, 108, thereby attaching the valve plate 58, the pads 98, 104 and the retainers 102, 108 together. For example, the pads 98, 104 may be made of a deformable wire-mesh material, and thus, the retainers 102, 108 may facilitate attachment and retention of the pads 98, 104 to the valve plate 58.

In some configurations, the first pad 98 may be attached to the valve seat 62 as oppose to the valve plate 58 and/or the second pad 104 may be attached to the baffle 110 as oppose to the valve plate 58. In such configurations, the valve plate 58 may be sealingly engaged with the second pad 104 when in the first position and sealingly engaged with the first pad 98 when in the second position.

As shown in FIGS. 6 and 7, a cup-shaped baffle 110 may extend from the inner surface 50 of the first shell 36 into the first fluid passageway 34 and may define an opening 112 that is in fluid communication with the heat exchanger outlet 42. The baffle 110 may have a rectangular-shaped plate 111 and flanges 113. The plate 111 may define the opening 112 and the flanges 113 may extend from opposing edges 125 of the plate 111 and may be coupled (e.g., welded) with the inner surface 50 of the first shell 36. When the valve plate 58 is in the first position, the second pad 104 may be sealingly engaged with the baffle 110 along a periphery of the opening 112 to prevent fluid flow through the second fluid passageway 35. In some configurations, flanges (not shown) may extend from opposing edges 117 of the plate 111 and may be coupled (e.g., welded) with the inner surface 50 of the first shell 36. In this way, when the valve plate 58 is in the first position, fluid in the baffle 110 may not be able to leak through any gaps between the baffle 110 and the first shell 36.

The second pad 104 may be made of a wire-mesh material or any other suitable material that reduces noise as the second pad 104 is sealingly engaged with the baffle 110 along the periphery of the opening 112. The valve plate 58, the pads 98, 104 and the retainers 102, 108 may also be parallel to a longitudinal axis 113 of the housing assembly 22 when the valve plate 58 is in the first position (FIG. 6). When the valve plate 58 is in the second position (FIG. 7), the first pad 98 may be sealingly engaged with the valve seat 62 along a periphery of the opening 76 such that fluid is not allowed to flow through the bypass passageway 34. The first pad 98 may be made of a wire-mesh material or any other suitable material that reduces noise as the first pad 98 is sealingly engaged with the valve seat 62 along the periphery of the opening 76. In some configurations, the valve plate 58 may be movable to a third or intermediate position (i.e., a position between the first position and second positions). In such configurations, the valve plate 58 may control fluid flow through both the first fluid passageway 34 and the second fluid passageway 36.

The heat exchanger assembly 26 may be attached to the first shell 36 at the top side 44 and may include end cones 115 and a heat exchanger core 116 that are in fluid communication with each other. Each end cone 115 consists of a single piece that is deep drawn. As shown in FIGS. 6 and 7, the end cones 115 and the heat exchanger core 116 may also cooperate with the heat exchanger inlet 40 and the heat exchanger outlet 42 to define the second fluid passageway 35. The end cones 115 are attached to opposing ends of the heat exchanger core 116. One of the end cones 115 may be attached (e.g., welded) to the first shell 36 at a location upstream of the heat exchanger core 116 and may define an opening 117 that is in fluid communication with the heat exchanger inlet 40. The opening 117 may be smaller than the heat exchanger inlet 40 so that a land 119 is formed for welding the first shell 36 to the one of the end cones 115.

Another of the end cones 115 may be attached (e.g., welded) to the first shell 36 at a location downstream of the heat exchanger core 116 and may define an opening 118 that is in fluid communication with the heat exchanger outlet 42. The opening 118 may be smaller than the heat exchanger outlet 42 so that a land 131 is formed for welding the first shell 36 to the other of the end cones 115. When the valve plate 58 is in the first position (FIG. 6), the valve plate 58 is sealingly engage with the baffle 110 at the location downstream of the heat exchanger core 116 such that fluid flow at the location downstream of the heat exchanger core 116 is prevented (i.e., the opening 118, the opening 112 and the heat exchanger outlet 42 is not in fluid communication with the outlet 32). In some configurations, the baffle 110 may extend from the inner surface 50 of the first shell 36 into the first fluid passageway 34 and may define the opening 112 that is in fluid communication with the heat exchanger inlet 40. In such configurations, when in the first position, the valve plate 58 may be sealingly engaged with the baffle 110 at a location upstream of the heat exchanger assembly 26 such that fluid flow into the heat exchanger assembly 26 is prevented. Each end cone 115 may include a curved surface 120 that facilitates fluid flow through the heat exchanger assembly 26.

The heat exchanger core 116 is positioned above the top side 44 of the first shell 36 such that a gap 121 (FIGS. 4, 6 and 7) exists therebetween. This reduces heat conducted from the housing assembly 22 to the heat exchanger assembly 26. With references to FIGS. 6-8, the heat exchanger core 116 may include a top coolant plate or tube 122, a plurality of interior coolant plates or tubes 123 and a bottom coolant plate or tube 124 that extend parallel to each other and to the longitudinal axis 113 of the housing assembly 22. The top coolant plate 122 may cooperate with a top plate 126 of the heat exchanger core 116 to define a first coolant cavity 128. The bottom coolant plate 124 may cooperate with a bottom plate 130 of the heat exchanger core 116 to define a second coolant cavity 132. The interior coolant plates 123 may cooperate with each other such that third coolant cavities 134 are formed therebetween.

Working fluid (e.g., engine coolant, engine oil, or transmission fluid) may enter the cavities 128, 132, 134 via an inlet 136 where the working fluid is circulated through the cavities 128, 132, 134 before exiting the cavities 128, 132, 134 via an outlet 138. Exhaust gas may flow through passages 140 (FIGS. 6-8) defined between the plates 122, 123, 124 and may transfer heat to working fluid circulating through the cavities 128, 132, 134. In this way, heat recovered by working fluid exiting the cavities 128, 132, 134 may be used for rapid warm-up of engine coolant to aid in faster windshield defrosting, improved HVAC (heating, ventilation and air condition) system performance, and/or to improve fuel economy by reducing viscous losses through heating of various fluid systems in the vehicle, such as engine oil and transmission fluid, for example. It should be understood that the coolant cavities 128, 132, 134 are fluidly isolated from the passages 140.

As shown in FIGS. 6 and 7, L-shaped flanges 139 may extend from the bottom coolant plate 124 of the heat exchanger core 116 and may cooperate with the bottom plate 130 and respective end cones 115 to define an aperture 141. The heat exchanger core 116 and the end cones 115 may be attached to each other by welding at the aperture 141.

As shown in FIGS. 5-7, a first U-shaped indentation 142 is formed in the second shell 38 and extends into the bypass passageway 34. A second indentation 144 is formed in the first shell 36 at the top side 44 and extends into the bypass passageway 34. The first indentation 142 and the second indentation 144 allow the housing assembly 22 to flex as the housing assembly 22 expands and the EGHR system 10 experiences thermal stresses, which prevent damage to the EGHR system 10. For example, the housing assembly 22 may operate at a higher temperature than the heat exchanger assembly 26 due to exhaust gas flowing through the housing assembly 22 and working fluid circulating through the heat exchanger assembly 26. The housing assembly 22 may expand because of the increase temperature, which causes thermal stress in the system 10 (i.e., due to the temperature difference between the housing assembly 22 and the heat exchanger assembly 26). The first and second indentations 142, 144 allow the housing assembly 22 to flex as thermal stress occurs, which prevents damage to the EGHR system 10.

With reference to FIGS. 1, 3, 5 and 8, the actuator assembly 28 may include a first plate 146, a second plate 148, a bracket 150 (FIGS. 5 and 8), a coiled spring 152 (FIG. 8) and an actuator 154. The first plate 146 may include a plate surface 156 and attachment members 158 extending from a periphery of the plate surface 156. The plate surface 156 may define an opening 159 (FIG. 8) extending therethrough. The attachment members 158 may be attached (e.g., welded) to the housing assembly 22. As shown in FIG. 8, the second plate 148 may include an inner portion 160, an intermediate portion 162 and flanges 164. The inner portion 160 may be attached (e.g., welded) to the plate surface 156 of the first plate 146 and may define an opening 166 extending therethrough. The intermediate portion 162 may extend outwardly (i.e., away from the housing assembly 22) from the inner portion 160 and may cover a side of the actuator 154 that is facing the housing assembly 22, thereby reducing the actuator 154 exposure to heat from the housing assembly 22. The flanges 164 may extend from a periphery of the intermediate portion 162 and may define openings (not shown) extending therethrough.

The L-shaped bracket 150 may extend through the openings 159, 166 of the plate surface 156 and the inner portion 160, respectively, and may be rotatably attached to the other of the ends 84 of the valve shaft 56 such that rotation of the bracket 150 causes corresponding rotation of the valve shaft 56 and the valve plate 58. The bracket 150 may include an end portion 168 that defines a groove 170 therein. A first end 172 of the spring 152 may be disposed in the groove 170 and a second end 174 of the spring 152 may be engaged to the actuator 154. In this way, the actuator 154 is configured to rotate the valve shaft 56 (via the spring 152 and the bracket 150), which, in turn, rotates the valve plate 58 between the first and second positions. A control module (not shown) may communicate with the actuator 154 to rotate the valve shaft 56 and the valve plate 58 between the first and second positions based at least partially on a temperature of the engine 16 or working fluid flowing through the heat exchanger assembly 26, for example. The bracket 150 and the spring 152 may provide a torturous path from the valve shaft 56 to the actuator 154, which reduces heat conducted from the valve shaft 56 to the actuator 154. The spring 152 may also reduce any vibration transferred to the actuator 154 from the valve plate 58 as the valve plate 58 contacts the baffle 110 and the valve body 54.

The actuator 154 may include mounting portions 176 that may extend from the actuator 154 and may define openings (not shown) that are aligned with openings (not shown) of the flanges 164. Bolts 178 may extend through the openings of the mounting portions 176 and the openings of the flanges 164 to mount the actuator assembly 28 to a vehicle component (not shown). It should be understood that each trunnion 60 is adapted to cooperate with the actuator assembly 28 and allow the actuator assembly 28 to be positioned on either side of the valve seat 62 and the housing assembly 22 without changes to the housing assembly 22, the valve assembly 24, or the heat exchanger assembly 26.

With continued reference to FIGS. 1-9, assembly of the EGHR system 10 will not be described. First, the end cones 115 are attached to opposing ends of the heat exchanger core 116. Next, the baffle 110 is attached (e.g., welded) to the inner surface 50 of the first shell 36 so that the opening 112 is in fluid communication with the heat exchanger outlet 42.

Next, the second shell 38 is attached (e.g., welded) to the valve seat 62 of the valve housing 54. That is, the bottom wall 70 and the bottom 78 of the second shell 38 are attached (e.g., welded) to each other and the side walls 74 and the sides 48 of the second shell 38 are attached (e.g., welded) to each other. After the valve shaft 56 is installed in the trunnions 60 of the valve seat 62, then the valve plate 58 is welded to the valve shaft 56.

Next, the first shell 36 and the heat exchanger assembly 26 are attached (e.g., welded) to each other. That is, the first shell 36 and the one of the end cones 115 are welded together via the land 119 so that the opening 117 is in fluid communication with the heat exchanger inlet 40, and the first shell 36 and the other of the end cones 115 are welded together via the land 131 so that the opening 118 is in fluid communication with the heat exchanger outlet 42.

Next, the first and second shells 36, 38 are attached (e.g., welded) to each other along the joint 49 and are also attached (e.g., welded) to the valve seat 62 at each land 71. Finally, the actuator assembly 28 is attached to the housing assembly 22 and the valve shaft 56 of the valve assembly 24, as described above. The assembly of the EGHR system 10 as described above reduces overall assembly time and also reduces manufacturing tolerances between parts of the EGHR system 10.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An exhaust gas heat recovery (EGHR) system, comprising:
a housing defining an inlet, an outlet, and a first exhaust gas passageway in fluid communication with the inlet and the outlet;
a heat exchanger at least partially defining a second exhaust gas passageway in fluid communication with the inlet and the outlet and including a heat exchanger core having a working fluid circulating therein, the working fluid being in thermal communication with exhaust gas in the second exhaust gas passageway; and
a valve assembly disposed within the housing and including a monolithic valve body, a moveable valve plate and a rotatable valve shaft, the valve body including a bore, a valve seat surrounding the bore and trunnions monolithically formed with the valve seat, the trunnions being diametrically opposed to each other and laterally extending outside of the housing, the valve plate coupled for rotation with the valve shaft between a first position allowing exhaust gas flow through the bore and the first exhaust gas passageway, and a second position allowing exhaust gas flow through the second exhaust gas passageway and preventing exhaust gas flow through the bore and the first exhaust gas passageway, the valve shaft being supported for rotation by the trunnions.

2. The EGHR system of claim 1, wherein the valve body is a casting.

3. The EGHR system of claim 1, wherein the valve body is symmetrical about a plane dividing the first exhaust gas passageway in half.

4. The EGHR system of claim 1, wherein the trunnions protrude equal distances away from the housing so that an actuator is adaptable to be positioned on either side of the valve seat.

5. The EGHR system of claim 1, wherein each trunnion includes a cavity defined by an as-cast inner wall, the EGHR system further comprising a bushing directly engaging the as-cast inner wall and supporting the valve shaft for rotation.

6. The EGHR system of claim 1, wherein the valve seat includes lands surrounding each trunnion, the housing being welded to the valve seat at each land.

7. The EGHR system of claim 6, wherein the valve body includes outer walls contoured to correspond to inner walls of the housing to restrict exhaust gas from passing between the valve body and the housing.

8. The EGHR system of claim 1, wherein the trunnions are coaxially aligned.

9. The EGHR system of claim 1, wherein the housing includes first and second shells defining the inlet, the outlet and the first exhaust gas passageway, the valve shaft including an axis of rotation positioned at a joint of the first and second shells.

10. The EGHR system of claim 9, wherein the first shell includes first semi-circular recesses and the second shell includes second semi-circular recesses that cooperate to define openings at the joint, and wherein the trunnions extend through the openings and outside of the housing.

11. The EGHR system of claim 1, wherein the valve shaft and the trunnions are coaxially aligned, and wherein the valve plate is rotatable about an axis that is offset from the bore.

12. An exhaust gas heat recovery (EGHR) system, comprising:
a housing defining an inlet, an outlet, and a first exhaust gas passageway in fluid communication with the inlet and the outlet;
a heat exchanger at least partially defining a second exhaust gas passageway in fluid communication with the inlet and the outlet and including a heat exchanger core having a working fluid circulating therein, the working fluid being in thermal communication with exhaust gas in the second exhaust gas passageway; and
a valve assembly disposed within the housing and including a monolithic valve body and a rotatable valve plate, the valve body including a bore that forms a portion of the first exhaust gas passageway, a valve seat surrounding the bore and trunnions monolithically formed with the valve seat, the valve plate being coupled for rotation with the trunnions, the valve plate being rotatable between a first position spaced apart from the valve seat whereat the valve plate restricts exhaust gas flow through the second exhaust passageway and allows exhaust gas flow through the bore, and a second position in engagement with the valve seat to restrict exhaust gas flow through the bore and divert exhaust gas flow through the second exhaust gas passageway.

13. The EGHR system of claim 12, wherein the trunnions laterally extend outside of the housing.

14. The EGHR system of claim 12, wherein the valve body is a casting.

15. The EGHR system of claim 12, wherein the valve body is symmetrical about a plane dividing the first exhaust gas passageway in half.

16. The EGHR system of claim 12, wherein the trunnions protrude equal distances away from the housing so that an actuator is adaptable to be positioned on either side of the valve seat.

17. The EGHR system of claim 12, wherein the trunnions are coaxially aligned.

18. The EGHR system of claim 12, wherein the valve seat includes lands surrounding each trunnion, the housing being welded to the valve seat at each land.

19. The EGHR system of claim 12, wherein the housing includes first and second shells defining the inlet, the outlet and the first exhaust gas passageway, the valve plate rotatable about an axis positioned at a joint of the first and second shells.

20. The EGHR system of claim 19, wherein the first shell includes first semi-circular recesses and the second shell includes second semi-circular recesses that cooperate to define openings at the joint, and wherein the trunnions extend through the openings and outside of the housing.

* * * * *